Oct. 24, 1950 J. S. ABERCROMBIE 2,527,050
GATE VALVE
Filed Jan. 15, 1945 2 Sheets-Sheet 1

JAMES S. ABERCROMBIE
INVENTOR

Oct. 24, 1950  J. S. ABERCROMBIE  2,527,050
GATE VALVE

Filed Jan. 15, 1945  2 Sheets-Sheet 2

JAMES S. ABERCROMBIE
INVENTOR

BY J. Vincent Martin
Ralph R. Browning
Attorneys

UNITED STATES PATENT OFFICE 2,527,050

GATE VALVE

James S. Abercrombie, Houston, Tex., assignor to Cameron Iron Works, Houston, Tex., a corporation of Texas Application January 15, 1945, Serial No. 572,801

5 Claims. (Cl. 251—51)

This invention relates to valves and has for its general object the provision of an improved and cheaper gate valve.

It has been customary in the past to provide gate valves with relatively rigid seating surfaces against which were adapted to seat relatively rigid valve elements or gates and it was necessary that such seating surfaces and corresponding surfaces of the gates which were adapted to engage the same be very accurately formed in order that they might fit closely together and provide a seal when in closed position. This was both expensive and made for a heavy and unwieldy type of gate valve. Furthermore, any corrosion which might take place on either of the seating surfaces during the time that the gate valve was in open position would tend to prevent a proper seal when the valve was closed and thus interfere with its efficient operation.

Furthermore, in most types of gate valves, the closure element was made in the form of a wedge adapted to be forced in between the two seating surfaces in the valve body which were necessarily arranged at an angle to each other corresponding to the angle of the wedge. Thus, each seating surface on the wedge must not only have been formed accurately to seat against its corresponding seating surface on the body of the valve, but the two wedging surfaces on the closure member must have been disposed very accurately with respect to each other so that when moved into position between the two seating surfaces on the body of the valve they would engage and seal against both surfaces simultaneously. This presents a very difficult machining problem and makes for a more expensive as well as a less efficient valve construction.

More specifically, therefore, it is an object of this invention to provide a gate valve in which the seating surfaces need not be as accurately machined and formed as those of conventional gate valves in the past.

Another object of this invention is to provide a gate valve which will not require wedging action to effect a seal in closed position and which will therefore not have as great a tendency to become stuck in closed position.

Another object is to provide a gate valve in which a complete seal may be effected with a less expensive structure than heretofore employed.

Another object is to provide such a valve with a desired predetermined seating area.

Another object of this invention is to provide a gate valve with a closure which under pressure is capable of accommodating itself to slight variations in its seat.

Another object is to provide a gate valve with a closure and seating surface therefor both capable of flexing together under pressure to provide a perfect seat under all pressures.

Another object is to provide a valve in which distortion of the valve body or seat due to temperature and pressure changes will not prevent a proper seal between the closure member and its seat.

Other objects of this invention will become apparent from the following description taken in connection with the accompanying drawings wherein are set forth by way of illustration and example two embodiments of the invention.

Figure 1:
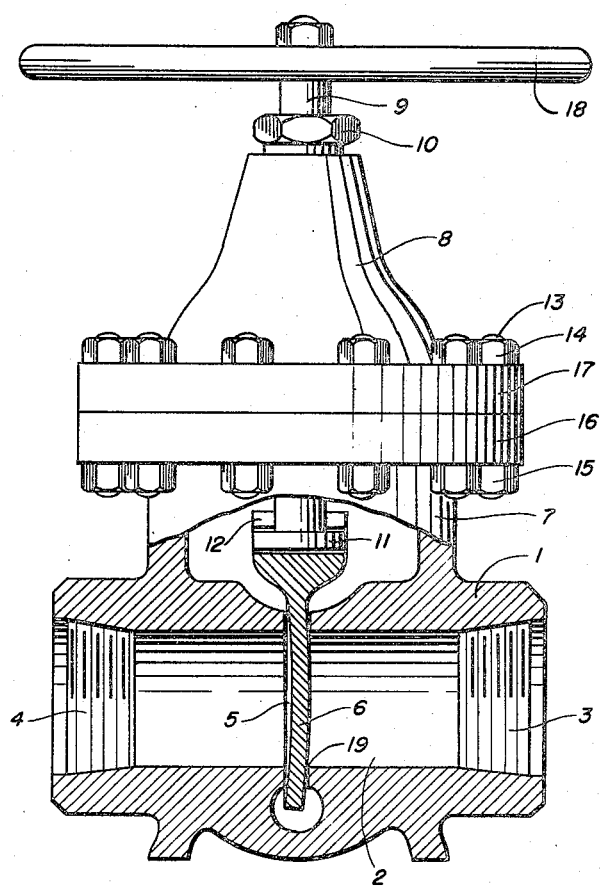
Fig. 1 is a view partly in side elevation and partly in vertical cross section illustrating a gate valve constructed in accordance with this invention.

Referring first to the structure illustrated in Fig. 1, the numeral 1 indicates the body of the valve which has a flow passage 2 therethrough provided at its opposite ends 3 and 4 with means for connecting pipes or conduits thereto. This means in the present instance is illustrated as being in the form of threads, but it will be understood that any suitable form of connecting means may be employed as the same form no part of this invention.

Intermediate its ends, the flow passage 2 is interrupted by a slot 5 which is of substantially uniform width throughout and which provides opposed seating surfaces adapted to receive the closure member of a gate valve, such closure member being indicated by the numeral 6.

Extending laterally in one direction from that portion of the body interrupted by the slot 5 is an extension 7 providing a chamber into which the closure member 6 may be withdrawn when the valve is moved to open position. This chamber is closed at its outer end by means of a bonnet 8 having a suitable opening therein for the purpose of permitting the passage of the valve stem 9. A suitable seal is formed about this stem within the opening in the bonnet 8 by means of proper packing and a gland nut 10 for tightening the same in the usual manner.

On the inner end of the stem 9 the same is provided with a flange-like part 11 adapted to be received in a T-slot 12 formed integrally with the closure member 6, so that when the stem 9 is moved outwardly or inwardly it will move the closure member 6 to open or closed position as the case may be. The stem is adapted to be moved outwardly or inwardly by rotation in the usual and well-known manner, the connection between the flange 11 and the slot 12 permitting such rotation without rotation of the closure member 6. The closure member is thus made free to float with respect to the body and stem in seating itself under pressure.

Studs 13 having nuts 14 and 15 thereon are provided for joining together the flanges 16 and 17 on the body extension 7 and the bonnet 8 respectively so as to secure the bonnet 8 in position on the body of the valve.

The stem may be rotated to move it inwardly and outwardly by means of the conventional hand wheel 18 or any other suitable device.

It will be seen that when the valve element or closure member 6 is in its closed position as illustrated, pressure against this valve element from the high pressure side of the valve, which in the instance illustrated is that side toward the opening 4, will cause the closure member 6 to be flexed. The slot 5 is of materially greater width than the thickness of the gate member 6 so as to accommodate the flexure of the gate member so the gate member may conform to the seat surface 19 carried by the slot 5. The closure member is thus illustrated as being of a different nature from other gate valve closure members used in the past. It is made sufficiently strong to withstand the pressures under which it is intended to operate, but not sufficiently massive to prevent substantial distortion under pressure. This distortion is made to serve a useful purpose in that the valve closure member 6 is made so flexible that it will distort under pressure until it effects a seal against the entire circumference of the seating surface on the body. In the instance illustrated in Fig. 1, this seating will under high pressures be concentrated along the inner corner of the valve seat as indicated by the numeral 19, and this in itself will tend to cause this sharp inner corner to cut through any possible corrosion that may have formed upon the closure member 6.

It is, of course, true that when the seating occurs adjacent the inner corner of the seating surface as indicated by the numeral 19 in Fig. 1, the seating area is substantially reduced below that which might be desired for extremely high pressures. In order to meet a situation such as this, the modification illustrated in Fig. 2 has been devised.

Figure 2:
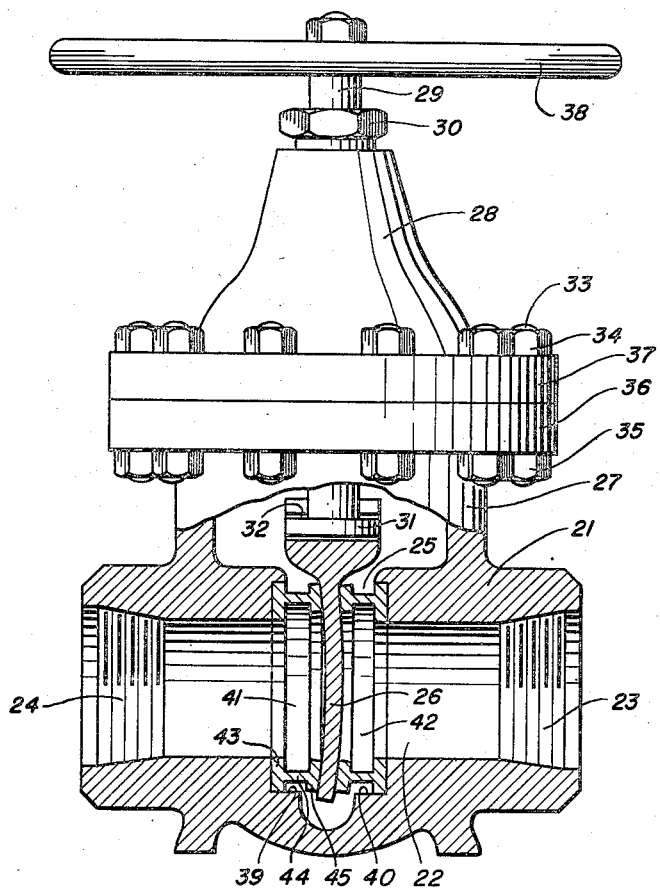
Fig. 2 is a view similar to Fig. 1 but illustrating a slightly modified form of construction.

Referring more in detail to the structure illustrated in Fig. 2, the valve body 21 is illustrated as having a flow passageway 22 therethrough with means 23 and 24 for securing pipes or other conduits thereto, and as having a slotted or open portion 25 intermediate the ends of such flow passage, into which the closure member 26 is adapted to be moved in closing the valve.

Extending laterally from the body member 21 is an extension 27 providing a chamber into which the closure member 26 may be withdrawn when the valve is open, and the outer end of this extension is adapted to be closed by a bonnet 28 through which the stem 29 extends, being sealed therein by a packing tightened by a gland nut 30 in substantially the same manner as illustrated in Fig. 1.

On the inner end of this stem is provided a flange 31 fitting in a T-slot 32 in the closure member 26 in substantially the same manner as the flange 11 fits in the slot 12 in Fig. 1.

Likewise, studs 33 having nuts 34 and 35 thereon are employed for joining together the flanges 36 and 37 of the extension 27 and the bonnet 28 respectively, thus securing the bonnet firmly in place on the extension 27. The stem also may be rotated by means of a suitable hand wheel 38 secured thereto in the usual manner.

The form illustrated in Fig. 2 differs substantially from that illustrated in Fig. 1 however in that on the opposite sides of the slot 25 it is provided with counterbores 39 and 40 adapted to receive seating elements 41 and 42 respectively. Each of these seating elements is provided with a flange portion 43 which seats within the counterbore just referred to, and from which extends an intermediate web portion 44 having a second flange-like portion 45 mounted along its free edge. These last mentioned flange-like portions are mounted in opposed relation to each other so as to provide the seating surfaces for the closure element 26. It will thus be seen that each of the seating elements 41 and 42 is of substantially I-shape cross section.

In this instance the two seating surfaces are spaced apart by substantially the thickness of the closure element 26 so that this closure element may freely pass between them. However, by virtue of the construction of the seating elements with the intermediate web-like portion 44, the seating flanges 45 are connected to their anchoring flanges 43 by flexible means and will themselves be permitted to flex under pressure when the closure member 26 flexes under pressure, and thus at all times to conform to the curvature of the closure member 26 when it is distorted by the pressure of the fluid being sealed against.

In the case of the structure shown in Fig. 2, just as in the case of the structure shown in Fig. 1, when the valve is closed, pressure from the high pressure side thereof will act upon the closure member, and because it is of such a construction that it has sufficient strength to withstand the pressure without bursting, but is made flexible so that it will yield substantially under pressure, it will yield and seat itself fully against all portions of the seating surfaces carried by the body. This is true even though the seating surfaces on the body and on the closure member have not been accurately formed with respect to each other. In the case of the valve illustrated in Fig. 1 this flexing of the closure element 6 tends to reduce the sealing area against which the closure element seats on the body of the valve. This may be of advantage in the case of valves operating against low pressures, because the load will not be so great that larger sealing areas are required in order to sustain the load, while the smaller sealing areas will tend to effect a more perfect seal. In the case of higher pressures, however, the structure illustrated in Fig. 2 will provide on the flanges 45 of the seating elements, seating surfaces which will be engaged by the flexible gate 26, and will flex with such gate so that no matter how great the pressure of the fluid being sealed against, it will not tend to decrease the seating area provided by these flanges 45.

From the foregoing it will be seen that a valve structure has been provided which is capable of accomplishing all of the objects and advantages sought by this invention.

Having described my invention, I claim:

1. In a gate valve, a body having a flow passage therethrough, and a slot interrupting the walls of said passage throughout its circumference, the opposed faces of said slot being formed to receive annular seat members, annular seat members received therein and formed with flexible parts having opposed seating surfaces adapted to receive a gate member and flexible to conform to the flexing of such gate member, a gate member comprising a plate of substantially uniform thickness and freely slidable in said slot between said seat members to engage the seating surfaces on said flexible parts, said plate being of a thickness and strength to flex substantially under the fluid pressure which it is intended to hold when in a closed position, whereby said plate and said parts will flex together to provide a close engagement therebetween when said gate member is flexed under pressure, and means to slide said gate member from one position to the other.

2. In a gate valve, a body having a flow passage therethrough and a slot interrupting the walls of said passage throughout its circumference, a gate member comprising a plate of substantially uniform thickness and freely slidable in said slot to close or open said passage, said plate being of thickness and strength to flex substantially under the fluid pressure which it is intended to hold when in a closed position, the opposed faces of said slot being formed to receive annular seat members, and seat members received therein and formed each with a flexible part having a seating surface and adapted to receive said gate member and flex therewith to provide a close engagement therewith when said gate member is flexed under pressure, and means for so moving said gate member.

3. In a gate valve, a body having a flow passage therethrough and a slot interrupting the walls of said passage throughout its circumference, a gate member comprising a plate freely slidable in said slot to close or open said passage, said plate being of a thickness and strength to flex substantially under the fluid pressure which it is intended to hold when in a closed position, the opposed surfaces of said slot being counterbored and formed to receive annular seat members, a pair of annular seat members of substantially I-shaped cross section each formed with a part having a seating surface adapted to receive said gate member and flexible therewith to provide a close engagement therewith when said gate member is flexed under pressure, and means for so moving said gate member.

4. In a gate valve, a body having a flow passage therethrough and a slot interrupting the walls of said passage throughout its circumference, a gate member comprising a plate of substantially uniform thickness and freely slidable in said slot to close or open said passage, said plate being of thickness and strength to flex substantially under the fluid pressure which it is intended to hold when in a closed position, the opposed faces of said slot being formed to receive annular seat members, and seat members received therein and formed each with a flexible flange-like part having a seating surface and adapted to receive said gate member and flex therewith to provide a close engagement therewith when said gate member is flexed under pressure, and means for so moving said gate member.

5. In a gate valve, a body having a flow passage therethrough and a slot interrupting the walls of said passage throughout its circumference, a seat surface carried by the slot, a free floating gate member comprising an imperforate plate of substantially uniform thickness and freely slidable in said slot to close or open said passageway and having a surface of contact adapted to engage said seat surface when said gate member is in closed position and pressure is exerted on said gate in a direction toward said seat surface, said slot being of a width great enough in an axial direction to freely receive the gate plate and said plate being of a thickness and strength to flex substantially under the fluid pressure which it is intended to hold when in a closed position and said surface of contact and seat surface being substantially parallel when the gate is in unstressed condition, and means to slide said gate, whereby the gate plate when in closed position is flexed by the pressure controlled to engage and conform to a continuous portion of the seat surface surrounding the passage and provide a seal.

JAMES S. ABERCROMBIE.

REFERENCES CITED

The following references are of record in the file of this patent:

UNITED STATES PATENTS

| Number | Name | Date |
|---|---|---|
| 863,764 | Taylor | Aug. 20, 1907 |
| 1,206,469 | Rockwell | Nov. 28, 1916 |
| 1,502,473 | Joule | July 22, 1924 |
| 1,636,618 | Wright | July 19, 1927 |
| 2,209,132 | Parker | July 23, 1940 |
| 2,209,134 | Parker | July 23, 1940 |
| 2,274,731 | Parker | Mar. 3, 1942 |

FOREIGN PATENTS

| Number | Country | Date |
|---|---|---|
| 699,018 | France | Dec. 8, 1930 |